United States Patent
Ritchie

(10) Patent No.: US 6,784,918 B1
(45) Date of Patent: Aug. 31, 2004

(54) SYSTEM FOR OBTAINING STATE INFORMATION FROM CONSUMER ELECTRONIC DEVICES

(75) Inventor: Jonathan G. Ritchie, Tualatin, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/219,134

(22) Filed: Dec. 22, 1998

(51) Int. Cl.[7] ............................................... H04N 7/18
(52) U.S. Cl. ........................ 348/61; 382/100; 382/190
(58) Field of Search .................... 348/207.11, 207.1, 348/211.4, 211.6, 212, 213, 160, 143, 61; 386/83; 345/327; 725/14, 21; 382/192, 100

(56) References Cited

U.S. PATENT DOCUMENTS

| | | | | |
|---|---|---|---|---|
| 5,467,264 A | * | 11/1995 | Rauch et al. ................ | 364/141 |
| 5,550,586 A | * | 8/1996 | Kudo et al. .................. | 348/222 |
| 5,771,307 A | * | 6/1998 | Lu et al. ...................... | 382/116 |
| 5,977,964 A | | 11/1999 | Williams et al. ............. | 345/327 |
| 6,115,057 A | | 9/2000 | Kwoh et al. .................. | 348/5.5 |
| 6,208,378 B1 | * | 3/2001 | Barraclough et al. ........ | 348/211 |
| 6,219,645 B1 | * | 4/2001 | Byers .......................... | 704/275 |
| 6,286,140 B1 | | 9/2001 | Ivanyi .......................... | 725/14 |
| 6,430,358 B1 | * | 8/2002 | Yuen et al. ................... | 386/83 |
| 6,441,927 B1 | * | 8/2002 | Dow et al. ................... | 358/473 |
| 6,542,077 B2 | * | 4/2003 | Joao ........................ | 340/426.16 |

* cited by examiner

*Primary Examiner*—Chris Kelley
*Assistant Examiner*—Behrooz Senfi
(74) *Attorney, Agent, or Firm*—Schwegman, Lundberg, Woessner & Kluth, P.A.

(57) ABSTRACT

A system and method of determining an operating state of a consumer electronic device allows a computer to control the consumer electronic device without user input. The system includes an image detection device for obtaining in image of the consumer electronic device. The image detection device can be a camera, or other sensor such as a photocell(s). A processor, or personal computer, is coupled to the image detection device for extracting information from a consumer electronic device display image. The processor generates control instructions for the consumer electronic device, and provides the control instructions to an infrared transmitter for transmitting the control instructions to the consumer electronic device.

17 Claims, 2 Drawing Sheets

SYSTEM FOR OBTAINING STATE INFORMATION FROM CONSUMER ELECTRONIC DEVICES

TECHNICAL FIELD OF THE INVENTION

The present invention relates generally to processor-based systems and in particular the present invention relates to controlling entertainment equipment using a processor.

BACKGROUND OF THE INVENTION

Modern personal computers can be augmented with hardware and software such that the personal computer can control other home devices such as televisions, video recorders, lights, heating and air conditioning systems, and other similar devices. As such, the personal computer's powerful computing environment allows a wide variety of device control features. For example, the personal computer could be implemented using a single command feature "Watch Video." This feature could cause the television, video recorder, and audio system to turn on, the video recorder to begin playing, and the television and audio system to select the proper input channel. Further, the lights in the room can be turned down by the processor to provide a more enjoyable viewing environment.

The personal computer typically controls external devices using the control protocol supported by each device. Several different control protocols are currently available. Although many external devices use different control protocols, the personal computer is capable of controlling a wide variety of devices by simultaneously supporting multiple control protocols.

The most common classes of controllable devices in households today are consumer electronic devices such as televisions, VCRs, stereo equipment, and home theater systems. Most consumer electronic devices support Consumer Infrared (IR) which consists of numerous proprietary control protocols. Consumer IR allows consumer electronic devices to be remotely controlled using a hand-held remote. For example, a user can change channels on a television by pressing the "Channel Up" button. When this button is pushed, the remote control sends an infrared command to the television, and the television increments its channel.

Infrared transmitter hardware can be added to personal computers (PC) to control consumer electronic devices. This allows the PC to mimic remote controls of various CE devices. Thus, the PC can autonomously control CE devices. However, a problem is encountered in controlling current consumer electronic devices. Specifically, Consumer IR assumes that a person controlling the consumer electronic device is able to observe the present state of the device, and adjust the command sequence accordingly. For example, most video recorders support a single "Power" command. This command changes the power state of the device, such that if the video recorder is off, the power command turns the device on. Likewise, if the video recorder is turned on, the power command turns the device off. Therefore, in order to get a device (e.g. the VCR) into a particular power state (on or off) it is essential that the person controlling the device know whether a consumer electronic device is already turned on. Similarly, to fully control consumer electronic device operations, a personal computer adapted to transmit IR commands needs to know the present state of the consumer electronic device.

For the reasons stated above, and for other reasons stated below which will become apparent to those skilled in the art upon reading and understanding the present specification, there is a need in the art for a system and method of determining an operating state of a consumer electronic device such that it can be controlled by a personal computer.

SUMMARY OF THE INVENTION

The above mentioned problems with controlling consumer electronic devices and other problems are addressed by the present invention and will be understood by reading and studying the following specification.

In particular, the present invention describes a system for automatic control of a consumer electronic device. The system comprises an image detection device for obtaining an image of a consumer electronic device display, a processor coupled to the image detection device for extracting information from the image of the consumer electronic device display and providing control instructions for the consumer electronic device, and an infrared transmitter for transmitting the control instructions to the consumer electronic device.

In another embodiment, a system for controlling a consumer electronic device comprises a camera for obtaining an image of the consumer electronic device, wherein the image comprises visual indications of an operating state of the consumer electronic device. The system includes a computer coupled to the camera for receiving the image and determining at operating state of the consumer electronic device based upon the image, a database containing instructions for changing the operating state of the consumer electronic device, and a transmitting device for transmitting the instructions to the consumer electronic device using infrared signals.

In yet another embodiment, a method is described for controlling a consumer electronic device using a processor. The method comprising obtaining an image of the consumer electronic device, wherein the image comprises visual indications of a first operating state of the consumer electronic device, decoding the image to determine the first operating state, generating control signals in response to the first operating state, and transmitting the control signals to the consumer electronic device to change the consumer electronic device to a second operating state.

DETAILED DESCRIPTION OF THE INVENTION

In the following detailed description of the preferred embodiments, reference is made to the accompanying drawings which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present inventions. The following detailed description is, therefore, not to be taken in a limiting sense, and the scope of the present invention is defined only by the appended claims.

To overcome the one-way limitation of consumer infrared control, a personal computer (processor) should determine a current state of a consumer electronic device in which control is desired. The processor is not limited to a traditional desk top computer. The present invention allows the personal computer to determine the current state of the consumer electronic device by using image processing techniques. One embodiment allows the personal computer to capture a live digital image of a physical device and apply various image processing techniques to determine the device's current operating state. For example, if a personal computer is trying to activate a video recorder, the personal computer can capture a digital image of the video recorder's front panel display. Applying video processing techniques, the personal computer can locate and identify individual icons displayed on the video recorder's front panel display. The existence or absence of certain icons can be used to determine the current state of the video recorder. Once the current state of the device is known, the personal computer can issue appropriate commands to place the video recorder into a desired state. For instance, if the only icon being displayed by the device is the "time of day" clock, the personal computer can determine that the video recorder is powered off. If the personal computer detects other icons, it can be determined that the video recorder is turned on. Using this information, the personal computer can accurately determine how to get the video recorder turned on (either by issuing a "power" command, or doing nothing).

Figure 1:
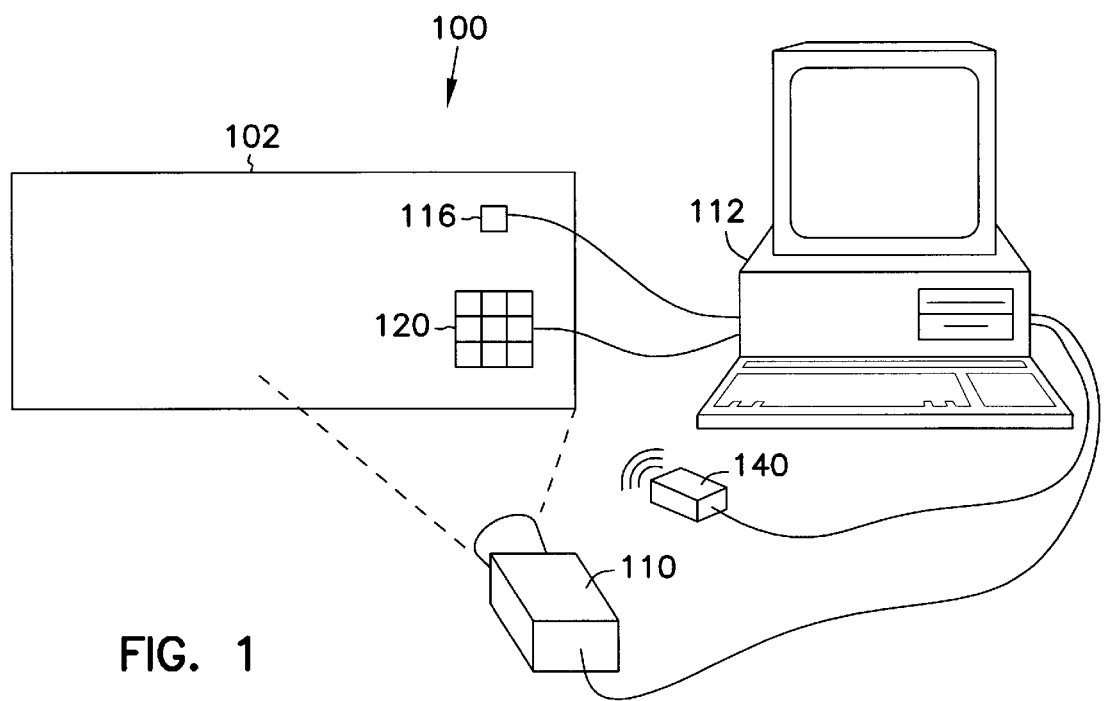
FIG. 1 illustrates a consumer electronic device and a camera.

FIG. 1 illustrates different ways in which a personal computer can determine an operating state of a consumer electronic device 100 using an image detection device, such as a camera or sensor. Again, the consumer electronic device can be a television, video recorder, stereo, home theater system, or the like. The consumer electronic device has a front panel, or display 102. This display provides visual feedback, or operating state indication, to a user. For example, when the consumer electronic device is a television, a current station and volume setting is typically displayed on the television screen. A camera 110 is provided, in one embodiment, having a field of view including the consumer electronic device to capture a video image of the consumer electronic device front panel. The camera is connected to a personal computer 112, as described in greater detail below. In another embodiment, an optical sensor 116 is provided to detect a light, or LED, provided on the consumer electronic device. The optical sensor is coupled to the personal computer. In another embodiment, an array of optical sensors 120 is coupled to the consumer electronic device and the personal computer.

Figure 2:
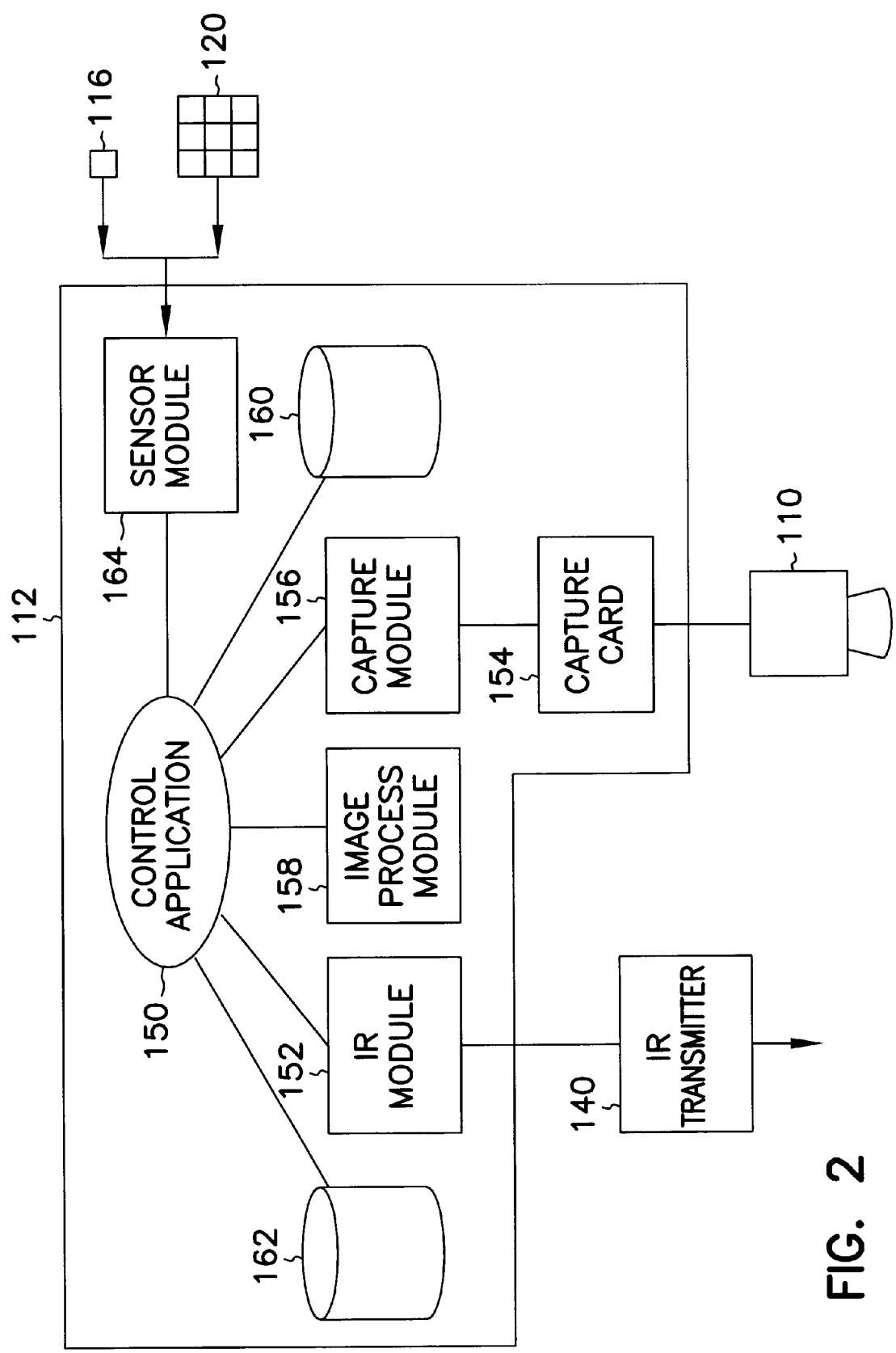
FIG. 2 is a block diagram of a consumer electronic control system.

Assuming that the consumer electronic device is a video recorder (VCR), the VCR can be controlled by the personal computer using an infrared transmitter. The infrared transmitter 140 is connected to the personal computer using one of several mechanisms including a serial port, universal serial bus (USB), or a powerline network, FIG. 2. The infrared transmitter is aimed at the VCR's infrared receiver (usually located on the front of the VCR) and generates consumer IR commands that mimic the device's hand-held remote control. A device control application 150, being executed by the personal computer, controls an infrared transmitter software module 152. Control commands are determined using the consumer IR database 162. The infrared transmitter software module then forwards commands to infrared transmitter hardware 140.

To capture a digital image of the VCR's front panel display, a video camera 110 is connected to the personal computer 112 using one of several options including a standard video capture card 154. The camera is aimed and focused on the VCR's front panel and sends a continuous video image stream to capture card 154. When the control application needs to determine a current state of the VCR, video capture software module 156 captures a digital image of the VCR's front panel display. The captured digital image is sent to image processing module 158 along with a description of various icons that can be displayed on the VCR's front panel. These icon descriptions are stored in database 160 and include information such as icons' location, shape, color, etc. Using these icon descriptions, the image processing module compares the digital image with possible VCR icons to determine which icons are currently displayed. An image processing software module 158 is provided for processing the digital video image captured from the camera.

Photocell 116, or photocell array 120 are used in a similar manner to provide information to the personal computer via wired or wireless communication. A sensor software module 164 can be executed by a control application 150 to determine a current state of the consumer electronic device. For example, a single photocell can be positioned on a front display of a television to indicate whether the television is turned on or off. Similarly, a photocell could be positioned to a light in the house or location of the PC such that the PC can control the light (on, off or brightness). Likewise, photocell array 120 can provide additional information by placing the array on icon display areas of the consumer electronic device.

The present system allows a personal computer to determine a present state of consumer electronic devices, including VCRs, and accurately control the device without any user intervention. By enabling the personal computer to determine the state of existing consumer electronic devices, the personal computer can provide a wide variety of device control applications using the millions of existing devices currently installed in people's homes.

A system and method of determining an operating state of consumer electronic devices have been described herein such that a personal computer can control the consumer electronic device without user input. The system includes an image detection device for obtaining an image of the consumer electronic device. The image detection device can be a camera, or other sensor such as a photocell(s). A processor is coupled to the image detection device for extracting information from a consumer electronic device display image. The processor generates control instructions for the consumer electronic device, and provides the control instructions to an infrared transmitter for transmitting the control instructions to the consumer electronic device. This application is intended to cover any adaptations or variations of the present invention. Therefore, it is manifestly intended that this invention be limited only by the claims and the equivalents thereof.

What is claimed is:

1. A system for automatic control of a consumer electronic device, the system comprising:
   an image detection device for obtaining an image of a consumer electronic device display;
   a processor coupled to the image detection device for extracting information from the consumer electronic device display image and providing control instructions for the consumer electronic device responsive to the information; and
   an infrared transmitter for transmitting the control instructions to the consumer electronic device.

2. The system of claim 1 wherein the consumer electronic device is a television, and the consumer electronic device display is a display of the television.

3. The system of claim 1 wherein the consumer electronic device is a video recorder, and the consumer electronic device display is a front panel of the video recorder.

4. The system of claim 1 wherein the image detection device is a camera having a field of view including the consumer electronic device display.

5. The system of claim 1 wherein the image detection device is a plurality of photo cells attached to the consumer electronic device display.

6. The system of claim 1 further comprising a first database, coupled to the processor, and comprising a conversion table for providing control instructions to the infrared transmitter for transmitting infrared signals.

7. The system of claim 6 further comprising a second database comprising an icon table for extracting the information from the consumer electronic device display image.

8. A system for controlling a consumer electronic device comprising:
- a camera for obtaining an image of the consumer electronic device, wherein the image comprises visual indications of an operating state of the consumer electronic device;
- a computer coupled to the camera for receiving the image and determining an operating state of the consumer electronic device based upon the image;
- a database containing instructions for changing the operating state of the consumer electronic device; and
- a transmitting device for transmitting the instructions to the consumer electronic device using infrared signals.

9. The system of claim 8 wherein the consumer electronic device is a video recorder.

10. The system of claim 8 wherein the consumer electronic device is a television.

11. A method of controlling a consumer electronic device using a processor, the method comprising:
- obtaining an image of the consumer electronic device, wherein the image comprises visual indications of a first operating state of the consumer electronic device;
- decoding the image to determine the first operating state;
- generating control signals in response to the first operating state; and
- transmitting the control signals to the consumer electronic device to change the consumer electronic device to a desired second operating state.

12. The method of claim 11 wherein the processor decodes the image, and compares the first operating state to the desired second operating state to generate the control signals.

13. The method of claim 11 wherein the consumer electronic device is a video recorder.

14. The method of claim 11 wherein the consumer electronic device is a television.

15. The method of claim 11 wherein the images obtained using a camera.

16. The method of claim 11 wherein decoding the image comprises accessing a data base of possible images which can be displayed by the consumer electronic device.

17. A computer readable medium for instructing the processor to perform the method of:
- obtaining an image of a consumer electronic device, wherein the image comprises visual indications of a first operating state of the consumer electronic device;
- decoding the image to determine the first operating state;
- generating control signals in response to the first operating state; and
- transmitting the control signals to the consumer electronic device to change the consumer electronic device to a second operating state.

* * * * *